(12) United States Patent
Kroon et al.

(10) Patent No.: US 7,452,094 B1
(45) Date of Patent: Nov. 18, 2008

(54) MAGNIFICATION APPARATUS

(76) Inventors: Joel D. Kroon, 267 High Castle La., Longwood, FL (US) 32779; Karen L. Kroon, 267 High Castle La., Longwood, FL (US) 32779

( * ) Notice: Subject to any disclaimer, the term of this patent is extended or adjusted under 35 U.S.C. 154(b) by 87 days.

(21) Appl. No.: 11/624,600

(22) Filed: Jan. 18, 2007

(51) Int. Cl.
*A47B 19/00* (2006.01)
*G02B 27/02* (2006.01)

(52) U.S. Cl. ............................. 362/98; 362/99; 359/802

(58) Field of Classification Search ................. 362/156, 362/153, 127, 98–99; 359/802–803, 809
See application file for complete search history.

(56) References Cited

U.S. PATENT DOCUMENTS

| | | | |
|---|---|---|---|
| 3,140,883 A * | 7/1964 | Anthony ........................ | 281/34 |
| 5,113,327 A * | 5/1992 | Levy ............................ | 362/157 |
| 5,471,347 A | 11/1995 | Galiani | |
| 5,639,156 A * | 6/1997 | Broxson ....................... | 362/99 |
| 5,813,748 A * | 9/1998 | Maxymych .................. | 362/154 |
| 6,023,377 A * | 2/2000 | Slager ......................... | 359/802 |
| 6,764,192 B2 | 7/2004 | McChesney | |
| 6,808,208 B2 * | 10/2004 | Ward ........................... | 281/31 |
| 6,830,356 B2 | 12/2004 | Larocque | |
| 6,951,403 B2 * | 10/2005 | Bennett, Jr. .................. | 362/98 |
| 6,955,442 B1 * | 10/2005 | Chan ........................... | 362/99 |
| 6,989,948 B2 * | 1/2006 | Hussaini et al. ............. | 359/809 |
| 7,277,241 B1 * | 10/2007 | Fulton ......................... | 359/805 |

* cited by examiner

*Primary Examiner*—Ali Alavi
(74) *Attorney, Agent, or Firm*—Crossley Patent Law; Mark A. Crossley

(57) ABSTRACT

A magnification apparatus that includes a foldable base, battery-powered lighting and an attached magnification sheet which can positioned over a book placed on top of the foldable base. The base has a left backing and a right backing which are connected to one another via a rubber hinge. The magnification sheet is connected to the top end of the base by a flexible bar and is capable of being placed over and above a book that is placed on top of the base for reading purposes. Both the left backing and right backing have separate light compartments that will provide lighting when the magnification apparatus is in use, with each of these lighting compartments being battery-powered through a separate battery compartment. Also, each of the backings has a set of teeth designed to prevent a book or other reading object from slipping off of the backings, with the teeth also interlocking to allow the left backing and right backing to be folded against one another.

8 Claims, 4 Drawing Sheets

MAGNIFICATION APPARATUS

BACKGROUND OF THE INVENTION

The present invention concerns that of a new and improved magnification apparatus that includes a foldable base, battery-powered lighting and an attached magnification sheet which can positioned over a book placed on top of the foldable base.

DESCRIPTION OF THE PRIOR ART

U.S. Pat. No. 5,639,156, issued to Broxson, discloses an illuminated book reading device which attaches to a book and has a text magnifying glass.

U.S. Pat. No. 6,830,356, issued to Larocque, discloses a book holder which has an illuminating feature as well as a magnifying feature.

U.S. Pat. No. 5,113,327, issued to Levy, discloses a device to assist with viewing an object which has an illuminating feature and a magnifying glass.

U.S. Pat. No. 5,471,347, issued to Galiani, discloses a container for printed matter which has a magnifier for text.

U.S. Pat. No. 6,764,192, issued to McChesney, discloses a text magnifying device which has an illumination feature.

SUMMARY OF THE INVENTION

The present invention concerns that of a new and improved magnification apparatus that includes a foldable base, battery-powered lighting and an attached magnification sheet which can positioned over a book placed on top of the foldable base. The base has a left backing and a right backing which are connected to one another via a rubber hinge. The magnification sheet is connected to the top end of the base by a flexible bar and is capable of being placed over and above a book that is placed on top of the base for reading purposes. Both the left backing and right backing have separate light compartments that will provide lighting when the magnification apparatus is in use, with each of these lighting compartments being battery-powered through a separate battery compartment. Also, each of the backings has a set of teeth designed to prevent a book or other reading object from slipping off of the backings, with the teeth also interlocking to allow the left backing and right backing to be folded against one another.

There has thus been outlined, rather broadly, the more important features of a magnification apparatus that the detailed description thereof that follows may be better understood and in order that the present contribution to the art may be better appreciated. There are, of course, additional features of the magnification apparatus that will be described hereinafter and which will form the subject matter of the claims appended hereto.

In this respect, before explaining at least one embodiment of the magnification apparatus in detail, it is to be understood that the magnification apparatus is not limited in its application to the details of construction and to the arrangements of the components set forth in the following description or illustrated in the drawings. The magnification apparatus is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present magnification apparatus. It is important, therefore, that the claims be regarded as including such equivalent constructions insofar as they do not depart from the spirit and scope of the present invention.

It is therefore an object of the present invention to provide a magnification apparatus which has all of the advantages of the prior art and none of the disadvantages.

It is another object of the present invention to provide a magnification apparatus which may be easily and efficiently manufactured and marketed.

It is another object of the present invention to provide a magnification apparatus which is of durable and reliable construction.

It is yet another object of the present invention to provide a magnification apparatus which is economically affordable and available for relevant market segment of the purchasing public.

Other objects, features and advantages of the present invention will become more readily apparent from the following detailed description of the preferred embodiment when considered with the attached drawings and appended claims.

DESCRIPTION OF THE PREFERRED EMBODIMENT

Figure 1:
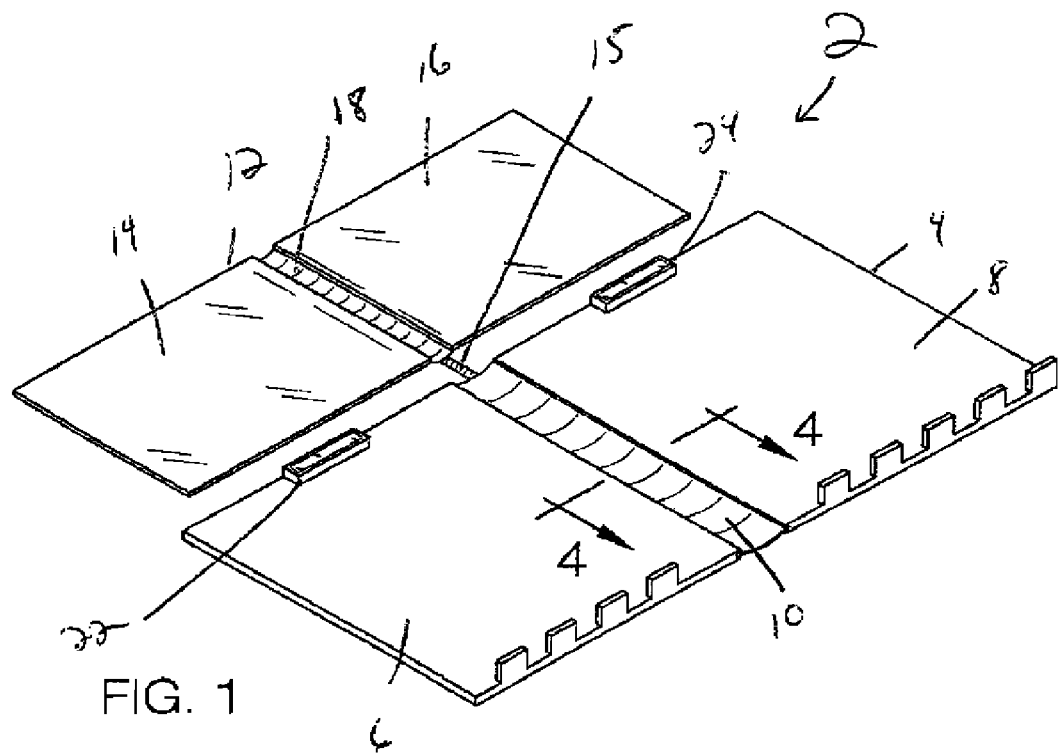
FIG. 1 shows a perspective view of the magnification apparatus as it would appear prior to use with a book.
Figure 2:
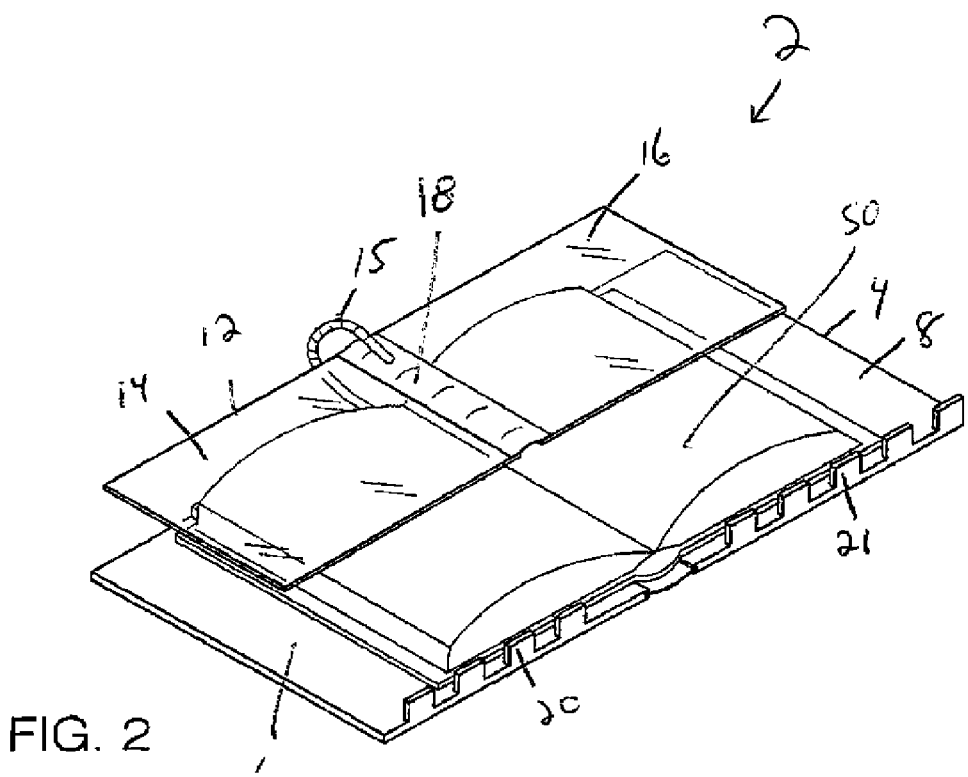
FIG. 2 shows a perspective view of the magnification apparatus as it would appear after a book has been placed on its base and the magnification sheet bent over the book.
Figure 3:
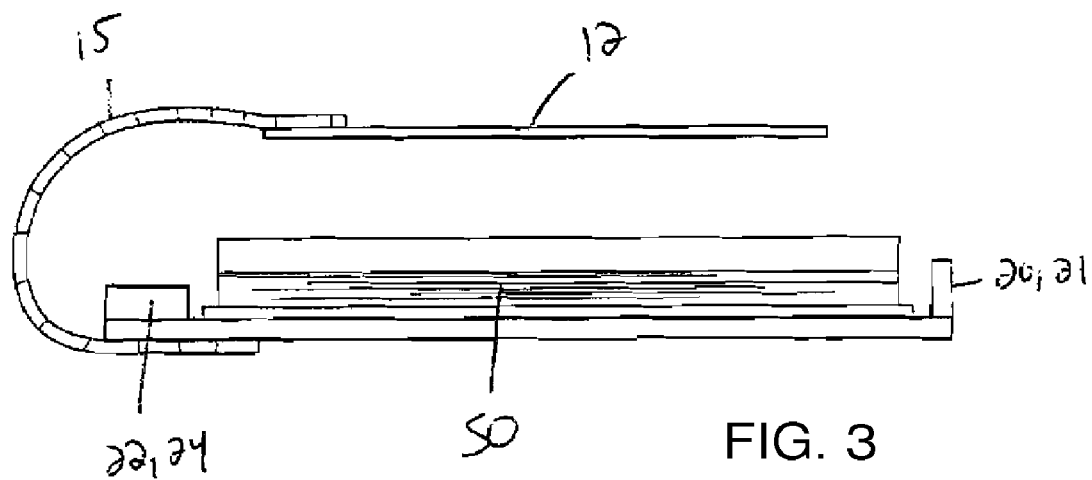
FIG. 3 shows a side view of the magnification apparatus as it would appear after a book has been placed on its base and the magnification sheet bent over the book.
Figure 4:
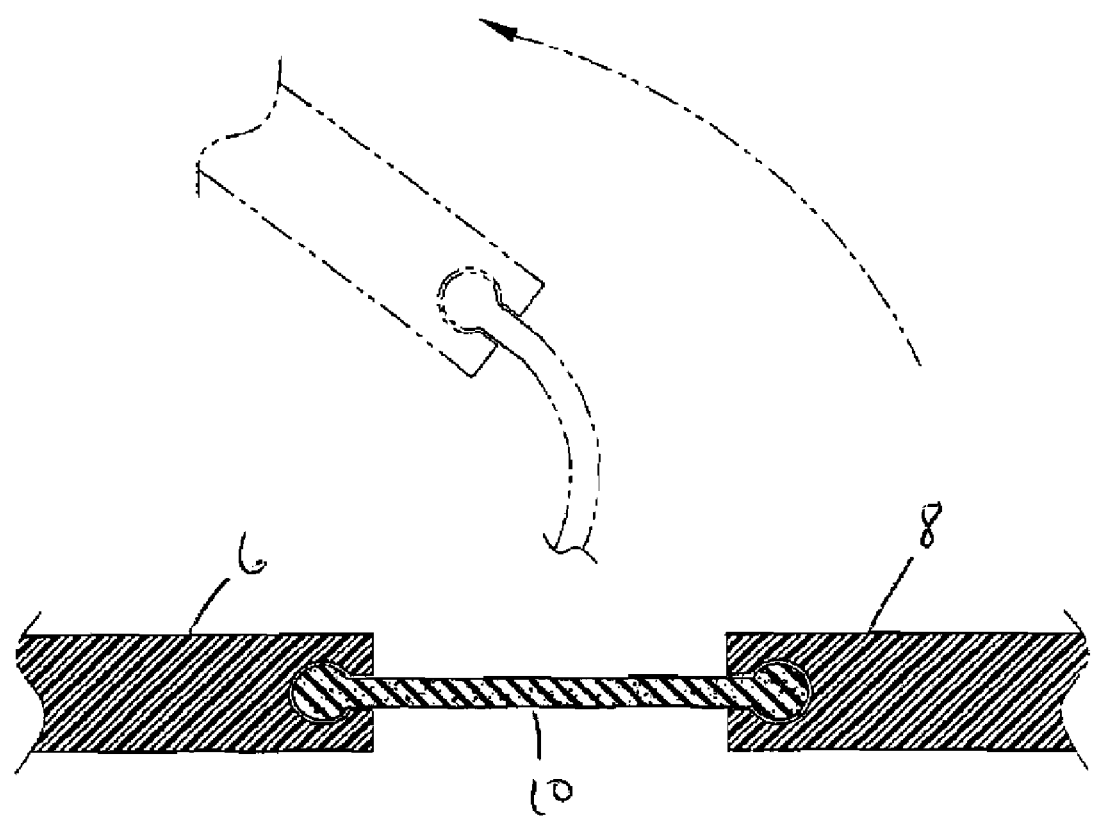
FIG. 4 shows an end view of the magnification apparatus as it would appear prior to use with a book, highlighting the connectivity of the left backing and the right backing of the base.
Figure 5:
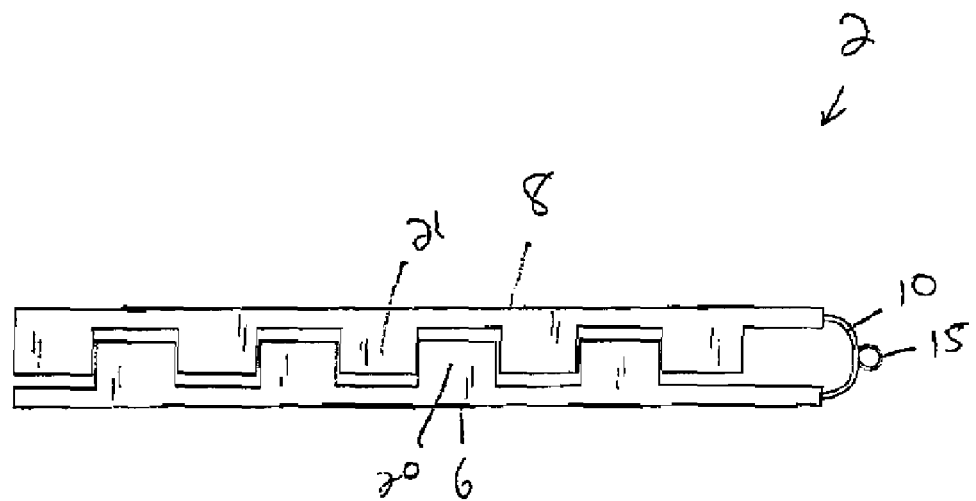
FIG. 5 shows an end view of the magnification apparatus as it would appear after the left backing and the right backing of the base have been folded together, showing how the teeth on the left backing and the right backing mesh with one another.
Figure 6:
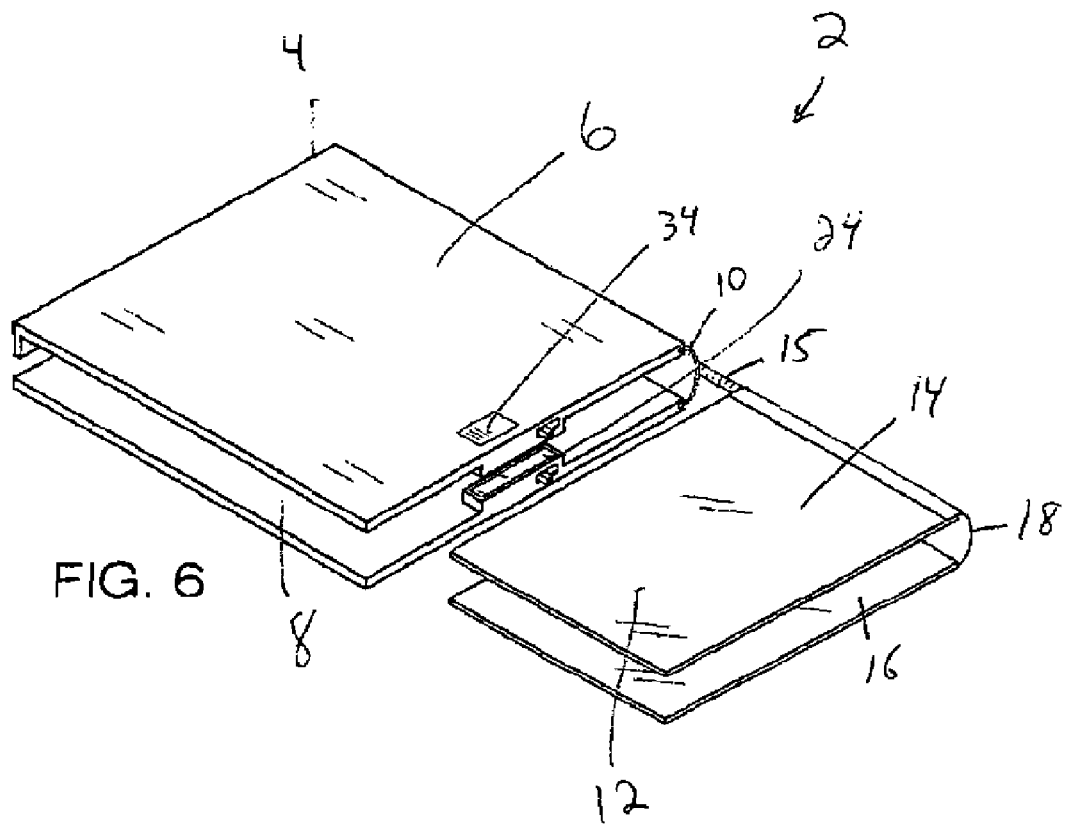
FIG. 6 shows a perspective view of the magnification apparatus as it would appear after the left backing and the right backing of the base have been folded together.
Figure 7:
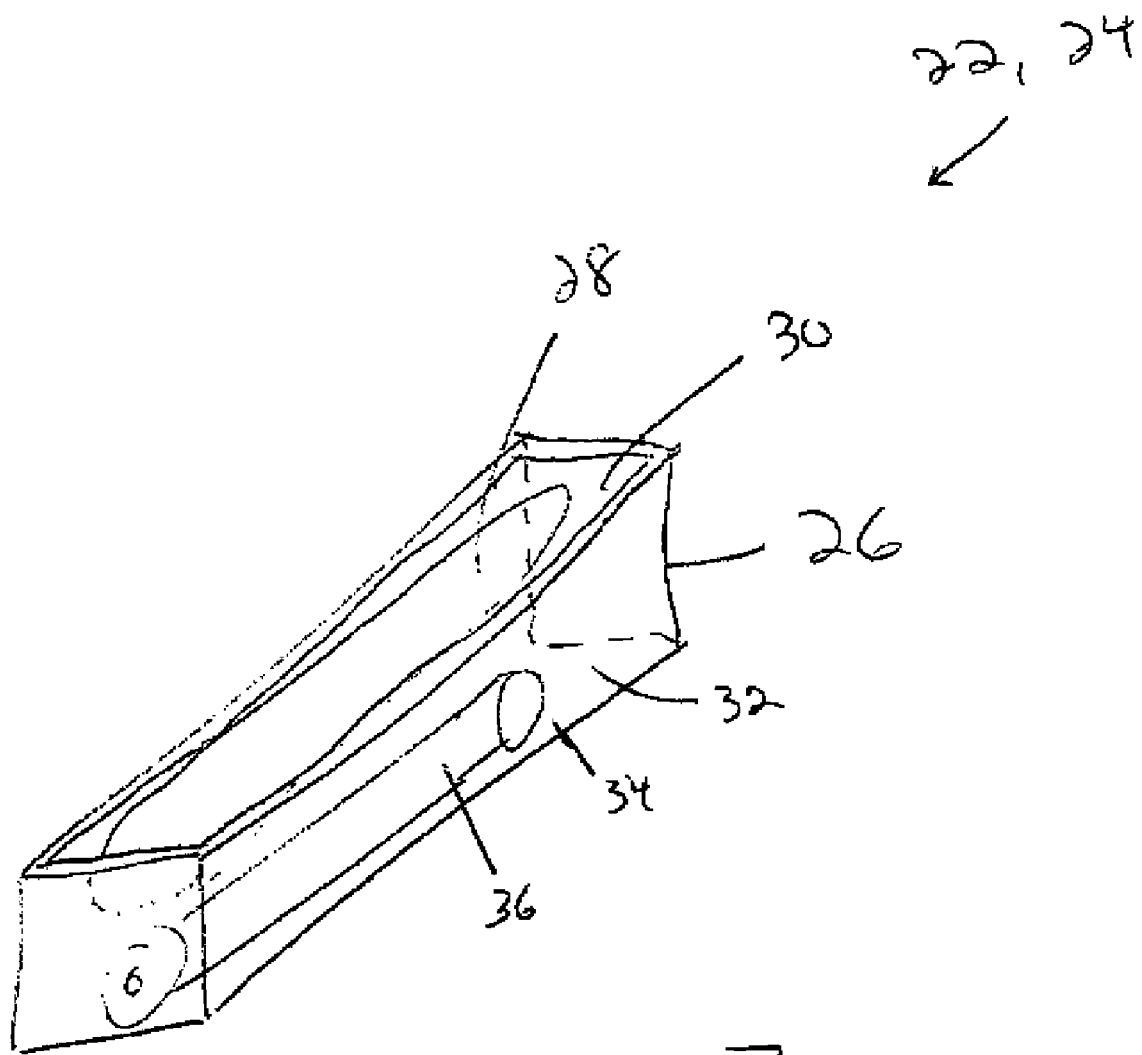
FIG. 7 shows a perspective cutaway view of a lighting unit associated with the magnification apparatus.

With reference now to the drawings, and in particular to FIGS. 1 through 7 thereof, a new magnification apparatus embodying the principles and concepts of the present invention and generally designated by the reference numeral 2 will be described.

As best illustrated in FIGS. 1 through 7, the magnification apparatus 2 comprises a base 4, which in turn, comprises two backings that comprise a left backing 6 and a right backing 8. Each of the backings comprises two sides comprising a left side and a right side, and furthermore, each of the backings has two ends comprising a top end and a bottom end. Each of the backings also has two surfaces comprising a top surface and a bottom surface.

A hinge 10 is used to connect the left backing 6 and the right backing 8 to one another. Preferably, the hinge 10 is connected to the right side of the left backing 6 and the left side of the right backing 8.

A magnification sheet 12 is also associated with the magnification apparatus 2. Magnification sheet 12 comprises two portions that comprise a left portion 14 and a right portion 16. Each of the portions comprises two sides comprising a left side and a right side, and furthermore, each of the portions has two ends comprising a top end and a bottom end. Each of the portions also has two surfaces comprising a top surface and a bottom surface. A hinge 18 connects the left portion 14 and the right portion 16 to one another, with the hinge 18 being connected to the left side of the right portion 16 and the right side of the left portion 14.

A flexible rod 15 has two ends comprising a first end and a second end. The first end of the rod 15 is connected to the hinge 10, while the second end of the rod 15 is connected to the hinge 18. The presence of rod 15 allows the magnification sheet 12 to be placed over a book 50 that might be placed on the top surface of the left backing 6 and right backing 8 for reading or viewing purposes.

The magnification apparatus 2 further comprises a pair of lighting units comprising a left lighting unit 22 and a right lighting unit 24. The left lighting unit 22 is located on the top surface of the left backing near the top end of the left backing 6, while the right lighting unit 24 is located on the top surface of the right backing near the top end of the right backing 8.

Each of the lighting units further comprises a base 26 attached to the top surface of a backing, a light 28 located within each base 26, and a cover 30 associated with and covering each base 26. Furthermore, a battery compartment 32 is located within each base 26. At least one battery 36 is located within each base 26, with the battery 36 being accessible through a battery cover 34 located on the bottom surface of a backing. The battery 36 within each base 26 is connected to the respective light 28 located within the same base 26.

The magnification apparatus 2 further comprises a left plurality of teeth 20 and a right plurality of teeth 21 that are connected to the backings. The left plurality of teeth 20 are connected to the bottom end of the left backing 6, while the right plurality of teeth 20 are connected to the bottom end of the right backing 8. Each of the two pluralities of teeth jut upwardly and away from the top surface of their respective backings. Each of the sets of teeth are designed to provide a "stop" to a book or other reading object that might be located on the top surface of the backings if the book happens to slip downward toward the bottom end of the backings 6 and 8. Furthermore, the two sets of teeth 20 and 21 are aligned so that the two sets of teeth interlock when the left backing 6 and right backing 8 are folded against one another.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A magnification apparatus comprising:
   a base, the base comprising two backings comprising a left backing and a right backing, each of the backings having two sides comprising a left side and a right side, each of the backings also having two ends comprising a top end and a bottom end, each of the backings also having two surfaces comprising a top surface and a bottom surface,
   means for flexibility connecting the left backing and the right backing to one another,
   means for magnifying an object placed on the top surfaces of the left backing and the right backing,
   means for providing additional lighting to an object placed on the top surfaces of the left backing and the right backing,
   wherein the means for flexibility connecting the left backing and the right backing to one another further comprises
      a first hinge,
      wherein the first hinge is connected to the right side of the left backing, and
      further wherein the first hinge is connected to the left side of the right backing, and
   wherein the means for magnifying an object placed on the top surfaces of the left backing and the right backing comprises
      a magnification sheet, the magnification sheet comprising two portions comprising a left portion and a right portion, each of the portions having two sides comprising a left side and a right side, each of the portions also having two ends comprising a top end and a bottom end, each of the portions also having two surfaces comprising a top surface and a bottom surface, and
      means for connecting the magnification sheet to the base, and
      means for flexibility connecting the left portion and the right portion of the magnification sheet to one another.

2. A magnification apparatus according to claim 1 wherein the means for flexibility connecting the left portion and the right portion of the magnification sheet to one another further comprises
   (a) a second hinge,
   (b) wherein the second hinge is connected to the right side of the left portion of the magnification sheet, and
   (c) further wherein the second hinge is connected to the left side of the right portion of the magnification sheet.

3. A magnification apparatus according to claim 2 wherein the means for connecting the magnification sheet to the base further comprises
   (a) a flexible rod having two ends comprising a first end and a second end,
   (b) wherein the first end of the rod is connected to the first hinge, and
   (c) wherein the second end of the rod is connected to the second hinge.

4. A magnification apparatus according to claim 3 wherein the means for providing additional lighting to an object placed on the top surfaces of the left backing and the right backing further comprises:
   (a) a pair of lighting units comprising a left lighting unit and a right lighting unit,
   (b) wherein the left lighting unit is located on the top surface of the left backing near the top end of the left backing, and (c) wherein the right lighting unit is located on the top surface of the right backing near the top end of the right backing.

5. A magnification apparatus according to claim 4 wherein the magnification apparatus further comprises means to prevent an object placed on the top surface of the left backing and the top surface of the right backing from slipping off of said backings.

6. A magnification apparatus according to claim 5 wherein the means to prevent an object placed on the top surface of the left backing and the top surface of the right backing from slipping off of said backings further comprises
 (a) a first plurality of teeth attached to the bottom end of the left backing,
 (b) a second plurality of teeth attached to the bottom end of the right backing,
 (c) wherein the teeth are interlocking when the left backing and the right backing are folded against one another.

7. A magnification apparatus according to claim 6 wherein each lighting unit further comprises:
 (a) a base attached to the top surface of its respective backing,
 (b) a light located within each base,
 (c) a cover for covering each light, and
 (d) a separate power means for providing power to each light.

8. A magnification apparatus according to claim 7 wherein each separate power means for providing power to each light further comprises:
 (a) a battery compartment located within each base,
 (b) at least one battery located within each battery compartment,
 (c) a battery cover to cover each battery compartment, the battery cover being accessible through the bottom surface of each backing,
 (d) wherein the battery within each battery compartment in each base is attached to the respective light associated with said base.

\* \* \* \* \*